United States Patent
Wallace et al.

(10) Patent No.: US 10,252,597 B2
(45) Date of Patent: Apr. 9, 2019

(54) JOINT ACTIVE THERMAL MANAGEMENT SYSTEM AND CONTROL LOGIC FOR HYBRID AND ELECTRIC VEHICLES

(71) Applicant: GM GLOBAL TECHNOLOGY OPERATIONS LLC, Detroit, MI (US)

(72) Inventors: William J. Wallace, Beverly Hills, MI (US); Pablo Valencia, Jr., Northville, MI (US); Wei Liu, Warren, MI (US); Peter J. Carleton, Rochester Hills, MI (US)

(73) Assignee: GM Global Technology LLC, Detroit, MI (US)

( * ) Notice: Subject to any disclaimer, the term of this patent is extended or adjusted under 35 U.S.C. 154(b) by 39 days.

(21) Appl. No.: 15/666,051

(22) Filed: Aug. 1, 2017

(65) Prior Publication Data
US 2019/0039434 A1   Feb. 7, 2019

(51) Int. Cl.
*B60H 1/00*   (2006.01)
*B60H 1/32*   (2006.01)
(Continued)

(52) U.S. Cl.
CPC ......... *B60H 1/00392* (2013.01); *B60H 1/004* (2013.01); *B60H 1/00342* (2013.01); *B60H 1/00571* (2013.01); *B60H 1/3204* (2013.01); *B60K 6/22* (2013.01); *B60L 11/187* (2013.01); *B60K 2001/003* (2013.01); *B60K 2001/008* (2013.01); *B60Y 2200/91* (2013.01); *B60Y 2200/92* (2013.01); *Y10S 903/904* (2013.01)

(58) Field of Classification Search
CPC ............ B60H 1/00392; B60H 1/00885; B60H 1/00342; B60H 1/3204; B60H 1/00571; B60H 1/004; B60H 1/143; B60H 1/00278; B60K 6/22; B60K 2001/003; B60K 2001/008; B60L 11/187; B60L 11/1874; B60L 11/1872; B60Y 2200/91; B60Y 2200/92; Y10S 903/904
See application file for complete search history.

(56) References Cited

U.S. PATENT DOCUMENTS

| 5,105,784 A | 4/1992 | Davis et al. |
|---|---|---|
| 6,450,275 B1 | 9/2002 | Gabriel et al. |

(Continued)

*Primary Examiner* — Emmanuel Duke
(74) *Attorney, Agent, or Firm* — Quinn IP Law

(57) ABSTRACT

Disclosed are joint active thermal management (ATM) systems for electric-drive vehicles, control logic for operating such ATM systems, and electric-drive vehicles equipped with a joint ATM system for heating/cooling the powertrain's drive unit (DU) section, power electronics (PE) section, and rechargeable energy storage system (RESS) section. A disclosed active thermal management system includes a first coolant loop with fluid conduits fluidly connecting a first electronic heat exchanger and a first pump with the DU and PE sections. The ATM system also includes a second coolant loop with fluid conduits fluidly connecting a second electronic heat exchanger and a second pump with the RESS section. A coolant-to-coolant heat exchanger, which is fluidly connected to the first and second coolant loops, is operable to selectively transfer heat between the coolant fluid circulating in the first set of fluid conduits and the coolant fluid circulating in the second set of fluid conduits.

20 Claims, 2 Drawing Sheets

(51) Int. Cl.
*B60L 11/18* (2006.01)
*B60K 6/22* (2007.10)
*B60K 1/00* (2006.01)

(56) References Cited

U.S. PATENT DOCUMENTS

| | | |
|---|---|---|
| 6,602,624 B1 | 8/2003 | Doan et al. |
| 7,264,895 B2 | 9/2007 | White |
| 7,759,010 B2 | 7/2010 | Hoch |
| 8,313,871 B2 | 11/2012 | Wexel et al. |
| 8,402,776 B2 | 3/2013 | Johnston et al. |
| 8,413,434 B2 | 4/2013 | Prior et al. |
| 8,603,654 B2 | 12/2013 | Cartwright et al. |
| 2012/0136535 A1* | 5/2012 | Buford ................ B60L 11/1892 701/36 |
| 2012/0316712 A1* | 12/2012 | Simonini ................ B60K 6/46 701/22 |
| 2014/0332179 A1* | 11/2014 | Vandike ............. B60H 1/00278 165/42 |
| 2015/0101549 A1 | 4/2015 | Bilancia |

* cited by examiner

JOINT ACTIVE THERMAL MANAGEMENT SYSTEM AND CONTROL LOGIC FOR HYBRID AND ELECTRIC VEHICLES

TECHNICAL FIELD

The present disclosure relates generally to electric-drive motor vehicles. More specifically, aspects of this disclosure relate to active thermal management systems for the power electronics, prime movers, and electric storage units of electric-drive vehicles.

BACKGROUND

Current production motor vehicles, such as the modern-day automobile, are originally equipped with a powertrain that operates to propel the vehicle and power the onboard vehicle electronics. In automotive applications, for example, the powertrain is generally typified by a prime mover that delivers tractive force through a multi-speed power transmission to the vehicle's final drive system (e.g., rear differential, axles, and road wheels). Automobiles have traditionally been powered by a reciprocating-piston type internal combustion engine (ICE) assembly because of its ready availability and relatively inexpensive cost, light weight, and overall efficiency. Such engines include compression-ignited (CI) diesel engines, spark-ignited (SI) gasoline engines, flex-fuel models, two, four and six-stroke architectures, and rotary engines, as some non-limiting examples. Hybrid and full-electric vehicles, on the other hand, utilize alternative power sources, such as fuel-cell or battery powered electric motors, to propel the vehicle and minimize/eliminate reliance on an engine for power.

During normal operation of hybrid and electric vehicles (collectively referred to herein as "electric-drive" vehicles), the internal combustion engine (ICE) assemblies and large traction motors generate a significant amount of heat that is radiated into the vehicle's engine compartment. To prolong the operational life of the prime mover(s) and the various components packaged within the engine bay, most automobiles are equipped with passive and active features for managing powertrain temperature. Passive measures for governing excessive heating within the engine compartment include, for example, thermal wrapping the exhaust runners, thermal coating of the headers and manifolds, and integrating thermally insulating packaging for heat sensitive electronics. Active means for cooling the engine compartment include high-performance radiators, high-output coolant pumps, and electric cooling fans. As another option, some vehicle hood assemblies are provided with active or passive air vents designed to expel hot air and amplify convective cooling within the engine bay.

Active thermal management (ATM) systems for automotive powertrains normally employ a central vehicle controller or dedicated control module to regulate operation of a cooling circuit that distributes fluid coolant, generally of oil, water, and/or antifreeze, through heat-producing powertrain components. For standard ICE applications, a coolant pump propels the cooling fluid—colloquially known as "engine coolant"—through coolant passages in the engine block, coolant channels in the transmission case and sump, and hoses to an air-cooled radiator. For early generation hybrid and electric vehicles, the in-vehicle active thermal management system used multiple independent thermal subsystems for cooling discrete segments of the powertrain. Some hybrid electric vehicle (HEV) ATM architectures required a dedicated coolant loop for the engine and transmission, a separate, independently controlled coolant loop for the electric motor(s) and power electronics modules, and yet another distinct coolant loop for regulating battery pack operating temperature. Such an approach is inherently inefficient as multiple independently operated thermal management subsystems require the vehicle be equipped with redundant sets of system components (e.g., a dedicated heat exchanger, a dedicated pump, dedicated valves, etc., for each loop).

BRIEF SUMMARY

Disclosed herein are joint ATM systems and related control logic for hybrid and electric vehicles, methods for making and methods for operating such ATM systems, and vehicles equipped with a joint ATM system for heating/cooling the powertrain's drive unit, electronics modules, electric storage unit, and other select components. By way of example, there is presented a novel ATM system topology architecture that maximizes use of power electronics-generated waste heat to warm the onboard propulsion batteries and prime mover(s). In particular, power electronics (PE) modules, such as the traction power inverter module (TPIM), accessory power module (APM), onboard charging module (OBCM), etc., are used as heating elements to heat the rechargeable energy storage system (RESS) and drive unit (DU) in select operating conditions. In cold weather conditions (e.g., below 0° C.), a PE/DU coolant loop is thermally coupled to a RESS coolant loop via a coolant-to-coolant (C2C) heat exchanger such that waste heat generated by the PE modules and, optionally, electric motors of the DU is used to warm the traction battery pack(s) of the RESS. Concomitantly, the RESS chiller and PE radiator are deactivated and/or thermally decoupled from the RESS loop. Comparatively, during mild weather conditions (e.g., approximately 0° C. to 30° C.), the PE/DU coolant loop is thermally coupled to the RESS coolant loop, while an air radiator loop is engaged and the RESS chiller is deactivated, to cool down the traction battery pack through ambient air. For hot weather conditions (e.g., above 30° C.), the RESS chiller loop and radiator loop are both engaged, while the PE/DU loop is thermally decoupled from the RESS coolant loop, to cool down the traction battery pack using the chiller and radiator fan.

Attendant benefits for at least some of the disclosed concepts include simplified active thermal management systems with fewer system components, which results in reduced packaging space requirements and lower vehicle costs. Disclosed joint ATM architectures also help to improve DU and RESS warm up performance at cold ambient. Aspects of the disclosed concepts also help to ensure optimal DU and RESS operating temperatures, faster warm up, and reduced specific consumption and emissions. By eliminating redundant ATM hardware, the disclosed ATM architectures also help to minimize energy consumption and reduce gross vehicle weight. In addition, battery thermal performance may be more stable due to continuous battery temperature control in mild weather conditions. Another attendant benefit may include extended battery service life due to thermal performance improvement.

Aspects of the present disclosure are directed to joint ATM architectures for regulating the operating temperatures of multiple electric-drive powertrain subsystems. Disclosed, for example, is a thermal management system for a hybrid or full-electric motor vehicle. This motor vehicle includes a drive unit section composed of one or more prime movers (e.g., an engine and/or an electric motor), a power electronics section composed of one or more dedicated electronic control modules, and a rechargeable energy storage system section composed of one or more electric storage units (e.g., an in-vehicle traction batter pack). The thermal management system includes a first electronic heat exchanger (e.g., a coolant-to-ambient radiator) that actively transfers heat from a first coolant fluid, and a first pump (e.g., a bi-directional electric coolant pump) that circulates the coolant fluid emitted from the first electronic heat exchanger. A first coolant loop fluidly connects the first electronic heat exchanger and first pump to the DU and the PE sections via a first set of fluid conduits. The thermal management system also includes a second electronic heat exchanger (e.g., a coolant-to-refrigerant RESS chiller) that actively transfers heat from a second coolant fluid, and a second pump (e.g., a unidirectional electric RESS coolant pump) that circulates the coolant fluid emitted from the second electronic heat exchanger. A second coolant loop fluidly connects the second electronic heat exchanger and second pump to the RESS section via a second set of fluid conduits. A coolant-to-coolant heat exchanger is fluidly connected to both the first and second coolant loops, and selectively transfers heat between the coolant fluid circulating in the first set of fluid conduits and the coolant fluid circulating in the second set of fluid conduits.

Other aspects of the present disclosure are directed to motor vehicles equipped with a joint ATM system for heating/cooling the powertrain's prime movers, power electronics modules, electric storage units, and other select components. A "motor vehicle," as used herein, may include any relevant vehicle platform, such as passenger vehicles (ICE, hybrid electric, full electric, fuel cell hybrid, fully or partially autonomous, etc.), commercial vehicles, industrial vehicles, tracked vehicles, off-road and all-terrain vehicles (ATV), farm equipment, boats, airplanes, etc. An electric-drive motor vehicle is presented that includes a vehicle body with multiple road wheels, and a RESS section with one or more traction battery packs. This vehicle is also equipped with a DU section composed of one or more electric motor/generators and, optionally, an engine that are operable, individually and in concert, to drive the road wheels. A PE section, which is composed of a traction power inverter module, an accessory power module, and/or an onboard charging module, helps to govern operation of the motor vehicle.

Continuing with the above example, the motor vehicle also includes a first coolant loop composed of an electric radiator, a radiator pump for circulating coolant fluid emitted from the radiator, and a first set of fluid conduits fluidly interconnecting the radiator, the radiator pump, the DU section, and the PE section. The vehicle is also equipped with a second coolant loop composed of an electric RESS chiller, a RESS pump for circulating coolant fluid emitted from the RESS chiller, and a second set of fluid conduits fluidly interconnecting the RESS chiller, the RESS pump, and the RESS section. A C2C heat exchanger is fluidly connected to the two coolant loops, and configured to selectively transfer heat between the radiator coolant circulating in the first set of fluid conduits and the chiller coolant circulating in the second set of fluid conduits. The ATM system may further include a third coolant loop with an air conditioning (AC) compressor that compresses a refrigerant-based coolant, an AC condenser that condenses compressed coolant emitted from the AC compressor, and fluid conduits that fluidly interconnect the AC compressor and AC condenser with the RESS chiller and an AC section of the motor vehicle. An optional three-way control valve fluidly connects the RESS section to the C2C heat exchanger, and selectively directs the flow of chiller fluid to and, when desired, diverts the chiller fluid around the C2C heat exchanger. Likewise, an optional bypass valve fluidly connects the C2C heat exchanger to the radiator, and selectively directs the flow of radiator fluid to and, when desired, diverts the fluid around the radiator.

Additional aspects of the present disclosure are directed to methods for making and methods for assembling any of the disclosed joint ATM systems. Aspects of the present disclosure are also directed to methods for operating disclosed joint ATM systems. Also presented herein are non-transitory, computer readable media storing instructions executable by at least one of one or more processors of one or more in-vehicle electronic control units, such as a programmable engine control unit (ECU) or powertrain control module, to govern operation of a joint ATM system.

The above summary is not intended to represent every embodiment or every aspect of the present disclosure. Rather, the foregoing summary merely provides an exemplification of some of the novel concepts and features set forth herein. The above features and advantages, and other features and advantages of the present disclosure, will be readily apparent from the following detailed description of illustrative embodiments and representative modes for carrying out the present disclosure when taken in connection with the accompanying drawings and the appended claims. Moreover, this disclosure expressly includes any and all combinations and subcombinations of the elements and features presented above and below.

Figure 1:
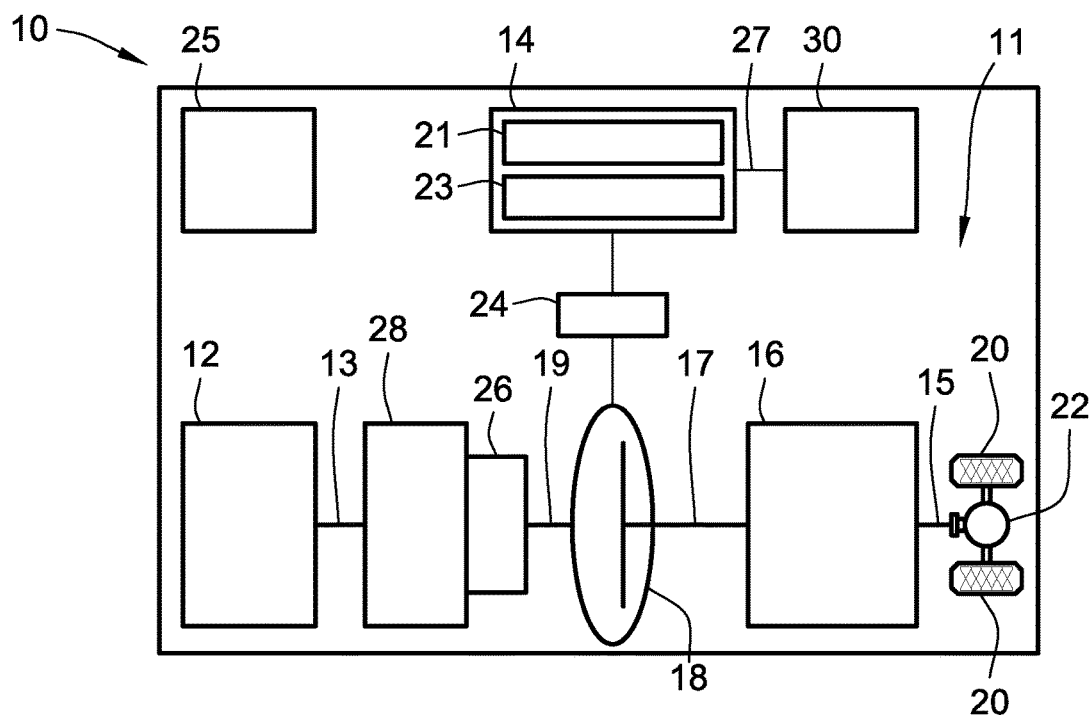
FIG. 1 is a schematic illustration of a representative motor vehicle with a joint active thermal management system in accordance with aspects of the present disclosure.

The present disclosure is amenable to various modifications and alternative forms, and some representative embodiments have been shown by way of example in the drawings and will be described in detail herein. It should be understood, however, that the novel aspects of this disclosure are not limited to the particular forms illustrated in the appended drawings. Rather, the disclosure is to cover all modifications, equivalents, combinations, subcombinations, permutations, groupings, and alternatives falling within the scope of this disclosure as defined by the appended claims.

DETAILED DESCRIPTION

This disclosure is susceptible of embodiment in many different forms. There are shown in the drawings and will herein be described in detail representative embodiments of the disclosure with the understanding that these illustrated examples are to be considered an exemplification of the disclosed principles and do not limit the broad aspects of the disclosure to the representative embodiments. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" and "having" and synonyms thereof mean "including without limitation." Moreover, words of approximation, such as "about," "almost," "substantially," "approximately," and the like, may be used herein in the sense of "at, near, or nearly at," or "within 3-5% of," or "within acceptable manufacturing tolerances," or any logical combination thereof, for example.

Referring now to the drawings, wherein like reference numbers refer to like features throughout the several views, there is shown in FIG. 1 a schematic illustration of a representative automobile, which is designated generally at 10 and portrayed herein for purposes of discussion as a passenger vehicle with a two-clutch parallel (P2) hybrid-electric powertrain. In particular, the illustrated powertrain is generally composed of a single engine 12 and a single motor 14 that operate, individually or in concert, to transmit tractive power to a multi-speed power transmission 16 through a hydrokinetic torque converter 18 to drive one or more drive wheels 20 of the vehicle's drivetrain 11. The illustrated automobile 10—also referred to herein as "motor vehicle" or "vehicle" for short—is merely an exemplary application with which novel aspects and features of this disclosure may be practiced. In the same vein, implementation of the present concepts into P2 hybrid-electric architecture should also be appreciated as an exemplary application of the novel concepts disclosed herein. As such, it will be understood that aspects and features of the present disclosure may be applied to other hybrid and full-electric powertrain architectures, and utilized for any logically relevant type of motor vehicle. Lastly, the drawings presented herein are not necessarily to scale and are provided purely for instructional purposes. Thus, the specific and relative dimensions shown in the drawings are not to be construed as limiting.

The representative vehicle powertrain is shown in FIG. 1 with a first prime mover, namely a restartable internal combustion engine (ICE) assembly 12 that is drivingly connected to a driveshaft 15 of a final drive system 11 via a multi-speed power transmission 16. The engine 12 transfers tractive force, generally by way of torque via an engine crankshaft 13, to an input side of the transmission 16. As shown, the prime mover 12 directly drives an engine disconnect device 28 which, when operatively engaged, drives the torque converter (TC) 18 via a torsional damper assembly 26. When operatively engaged, the engine disconnect device 28 transmits torque received from the ICE 12 by way of the damper 26 to input structure of the TC 18. The transmission 16, in turn, is adapted to receive, manipulate and distribute power from the engine 12 to the final drive system 11—represented herein by a rear differential 22 and a pair of rear drive wheels 20—and thereby propel the hybrid vehicle. In the example depicted in FIG. 1, the ICE assembly 12 may be any available or hereafter developed engine, such as a two or four-stroke compression-ignited diesel engine or a 4-stroke spark-ignited gasoline or flex-fuel engine, which is readily adapted to provide its available power output typically at a number of revolutions per minute (RPM). Although not explicitly portrayed in FIG. 1, it should be appreciated that the final drive system 11 may comprise any available configuration, e.g., front wheel drive (FWD), rear wheel drive (RWD), four-wheel drive (4WD), all-wheel drive (AWD), etc.

FIG. 1 also displays an electric motor/generator assembly 14 or other electric machine ("E-machine") that operatively connects to a main shaft 17 of the electro-hydraulic transmission 16 via the torque converter 18. The motor/generator 14 can be directly coupled onto a TC input shaft 19 or splined housing portion (e.g., a front cover) of the torque converter 18 via one or more selectively engageable torque transmitting mechanisms 24 (e.g., clutch, brake, etc.). The electric motor/generator 14 is composed of an annular stator 21 circumscribing and concentric with a rotor 23. Electric power is provided to the stator 21 through electrical conductors or cables 27 that pass through the motor housing in suitable sealing and insulating feedthroughs (not illustrated). Conversely, electric power may be provided from the motor 14 to an onboard traction batter pack 30 via regenerative braking. The term "battery pack" may be used herein to refer to multiple individual battery modules contained within a single-piece or multi-piece housing, the individual batteries electrically interconnected to achieve a desired voltage and capacity for a particular vehicle application. Operation of any of the illustrated powertrain components may be governed by an onboard or remote vehicle controller, such as programmable electronic control unit (ECU) 25. While shown as a P2 hybrid-electric architecture with a single motor in parallel power-flow communication with a single engine assembly, the vehicle 10 may employ other powertrain configurations, including PS, P1, P3, and P4 hybrid powertrains, any of which may be adapted for a hybrid electric vehicle (HEV), battery electric vehicle (BEV), plug-in electric vehicle (PEV), range-extended electric vehicle (REEV), or fuel-cell hybrid vehicle, as well as full-electric and standard ICE powertrains.

Control module, module, controller, control unit, electronic control unit, processor, and any permutations thereof may be defined to mean any one or various combinations of one or more of logic circuits, Application Specific Integrated Circuit(s) (ASIC), electronic circuit(s), central processing unit(s) (e.g., microprocessor(s)), and associated memory and storage (e.g., read only, programmable read only, random access, hard drive, tangible, etc.)), whether resident, remote or a combination of both, executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms may be defined to mean any controller executable instruction sets including calibrations and look-up tables. The ECU may be designed with a set of control routines executed to provide the desired functions. Control routines are executed, such as by a central processing unit, and are operable to monitor inputs from sensing devices and other networked control modules, and execute control and diagnostic routines to control operation of devices and actuators. Routines may be executed at in real-time, continuously, systematically, sporadically and/or at regular intervals, for example, each 100 microseconds, 3.125, 6.25, 12.5, 25 and 100 milliseconds, etc., during ongoing vehicle use or operation. Alternatively, routines may be executed in response to occurrence of an event.

Figure 2:
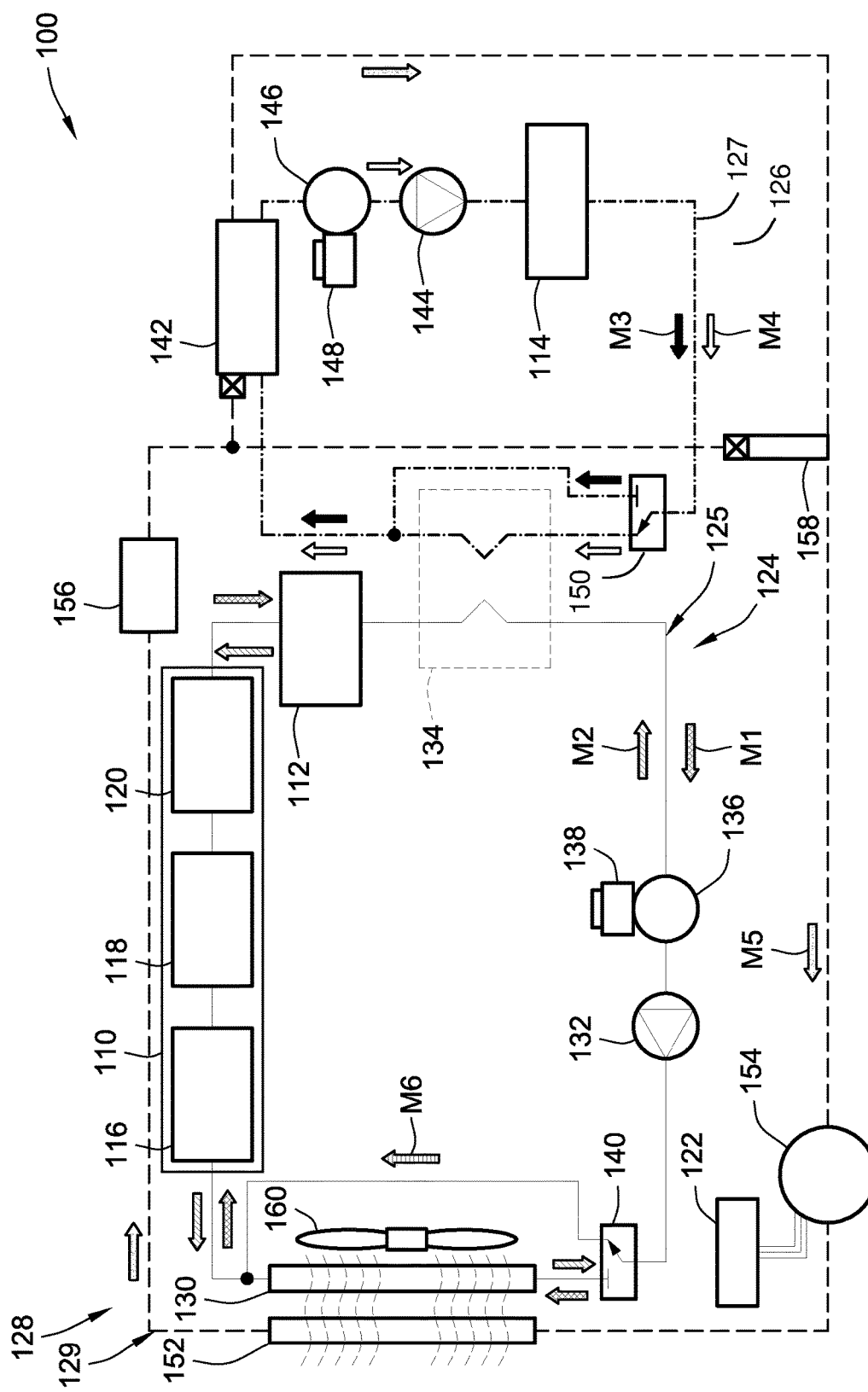
FIG. 2 is a schematic illustration of a representative joint ATM system for the power electronics modules, drive unit, and rechargeable energy storage unit of a hybrid or electric vehicle powertrain in accordance with aspects of the present disclosure.

Turning next to FIG. 2, there is shown a representative active thermal management (ATM) system 100 with a split-loop, joined-thermal-control coolant distribution architecture for regulating the operating temperatures of various powertrain components of a motor vehicle, such as the electric-drive automobile 10 of FIG. 1. These powertrain components are represented, in part, via a power electronics (PE) section 110, a drive unit (DU) section 112, and a rechargeable energy storage system (RESS) section 114, as some non-limiting examples presented in FIG. 2. Generally speaking, the DU section 112 is typified by the powertrain components operable to generate and transmit tractive forces for propelling a motor vehicle. All torque-generating powertrain components in power flow communication upstream from the shiftable multi-speed transmission 16 of FIG. 1 may be collectively referred to as the vehicle's 10 drive unit. As suggested above, with respect to the vehicle configuration 10, the DU section 112 of FIG. 2 outputs driving power through singular or cooperative operation of one or more prime movers, such as an electric motor 14 connected in series or in parallel with a combustion engine 12. Contrastingly, the RESS section 114 stores energy that can be used for propulsion by the electric machine(s) 14 and, in some applications, for operating other vehicle electrical systems. As shown, RESS section 114 is composed of an onboard rechargeable energy source, such as a high-voltage direct current (DC) traction battery pack 14 with an array of lead-acid, lithium-ion, nickel metal hydride, silver zinc, or other applicable type of electric vehicle battery (EVB). Recharging of the RESS subsystem components may be achieved through wired (e.g., via plug-type charging cable of an electric vehicle charging station (EVCS)) and/or wirelessly (e.g., utilizing electromagnetic filed (EMF) induction techniques) connectivity.

PE section 110 of FIG. 2 may be typified by a network of resident and/or remote electronic control modules that function to govern select operating aspects of an electric-drive vehicle. In accord with the representative topology of FIG. 2, the PE section 110 is represented herein by a traction power inverter module (TPIM) 116 (also referred to in the art as "single power inverter module" or SPIM), an accessory power module (APM) 118, and an onboard charging module (OBCM) 120, all of which may be DC-coupled via a high-voltage DC bus. Recognizably, the in-vehicle network of controllers may be comprised of fewer or greater or different modules than that which are shown in FIG. 2. Relevant examples of optional PE control modules include a powertrain control module (PCM), a transmission control module (TCM), an engine control module (ECM), and an air conditioning control module (ACCM) 122. A Vehicle System Controller (VSC), such as ECU 25 of FIG. 1, may coordinate operation of all main vehicle components by interfacing with the various PE subsystem 110 modules. Depending on the intended application of joint ATM system 100, the PE modules may each be a stand-alone electronic control module, as shown, or each may be incorporated within another electronic module in the vehicle (e.g., a vehicle integrated control module (VICM)), or the various illustrated modules may represent segments of a larger network or system, whether resident to or remote from the vehicle. In addition, the illustrated modules can be repositioned interchangeably in the PE coolant circuit.

OBCM 120 functions, in part, to regulate and monitor a wired or a wireless charging event, and communicate related charging information to other networked vehicle controllers. The OBCM 120 may also function as an AC-DC converter to convert an AC charging voltage from an off-board AC power supply, such as a vehicle charging station or other available EVSE, into a DC voltage suitable for use by a DC traction battery pack or other RESS storage unit. For at least some system applications, the OBCM 120 includes internal solid-state electronic components that work in concert to convert a voltage output from an AC power supply into a DC voltage input. Although omitted for illustrative simplicity, such internal structure may include one or more microprocessors, input and output waveform filters, passive diode bridges, semiconductor switches, such as MOSFETs or IGBTs, a link capacitor, and a transformer, as non-limiting examples. The TPIM 116 is an element of the PE control subsystem 110 that regulates transmission of electrical energy to and from the motor/generator(s) of DU section 112 and, in some applications, converts high-voltage DC power into three-phase AC power, and vice versa, as needed. TPIM 116 may include a set of power inverters, high-power transistors, and capacitor-based filters along with motor control hardware to receive motor control commands for providing motor drive and regeneration functionality. That is, the TPIM 116 may operate to control the motor 14 of FIG. 1 to function as a motor and provide driving torque to the wheels 20 or, when desired, to function as a generator and convert braking-related torque to electrical energy stored in the traction batter pack 30. The APM 118 is a DC-to-DC converter that converts power from the RESS section 114 to a standard vehicle voltage, such as a nominal voltage for 12V SLI battery and 12V vehicle accessory loads.

The joint ATM system 100 provides a split cooling system layout with three closed coolant loops—a PE/DU (first) coolant loop 124, a RESS (second) coolant loop 126, and an AC (third) coolant loop 128—that may be individually controlled to independently circulate coolant fluid for absorbing heat from components fluidly interconnected within that loop. The illustrated coolant loops also allow the system 100 to manage heat-distributing fluid flow to the DU and RESS sections 112, 114. With this configuration, the joint ATM system 100 is capable of deciding which part or parts of the vehicle powertrain to cool at a given time, and to which component or components of the vehicle powertrain will be delivered extracted waste-heat energy in the form of heated coolant fluid. While shown as fluidly isolated or "closed" loops, the illustrated ATM topology thermally couples the three coolant loops 124, 126, 128 at select locations to allow for the thermodynamic exchange of energy therebetween. It should be appreciated that the joint ATM system 100 of FIG. 2 may be modified to include additional coolant loops or, alternatively, to combine or eliminate select ones of the illustrated loops. It is also within the scope of this disclosure to fluidly couple two or more of these loops, e.g., through electronically controlled fluid valving, such that coolant fluid may be transferred therebetween (i.e., for open loop or continuous loop architectures).

With continuing reference to FIG. 2, the ATM system 100 employs several branches of fluid pipes, hosing, tubes, bores, passages, channels, etc. (collectively designated herein as "conduits") for fluidly connecting the illustrated components and splitting the coolant flow among the several loops of the system. For the PE/DU coolant loop 124, a dedicated (first) set of fluid conduits—shown in FIG. 2 with solid lines and designated generally at 125—fluidly interconnects a PE/DU (first) electronic heat exchanger 130 and a PE/DU (first) pump 132 with the PE and DU sections 110, 112. Also fluidly coupled in the PE/DU coolant loop 124 via the fluid conduits 125 are a coolant-to-coolant (C2C) heat exchanger 134, a PE/DU (first) air separator 136, a PE/DU (first) fluid reservoir 138, and a flow control bypass valve 140. Starting from the heat exchanger 130 and moving clockwise in FIG. 2, e.g., when the pump 132 is operating in a hot-temp (first) mode indicated by cross-hatch-filled coolant flow arrows M1: the PE/DU electronic heat exchanger 130 is fluidly upstream from and coupled to the PE section 110; the PE section 110 is fluidly upstream from and coupled to the DU section 112; the DU section 112 is fluidly upstream from and coupled to the C2C heat exchanger 134; the C2C heat exchanger 134 is fluidly upstream from and coupled to the air separator and reservoir 136, 138; the air separator and reservoir 136, 138 are fluidly upstream from and coupled to the pump 132; and the pump 132 is fluidly upstream from and coupled to bypass valve 140, which is fluidly upstream from and coupled to heat exchanger 130. Conversely, when the pump 132 is operating in a mild-temp (second) mode indicated by diagonal-hatch-filled coolant flow arrows M2, each of the elements listed in the preceding segment as "fluidly upstream" from a respective element is now fluidly downstream from that corresponding element.

In the RESS coolant loop 126, a dedicated (second) set of fluid conduits—shown in FIG. 2 with dash-dot-dash ( - • - ) lines and designated generally at 127—fluidly interconnects a RESS (second) electronic heat exchanger 142 and a RESS (second) pump 144 with the RESS section 114 of the motor vehicle. Also fluidly coupled in the RESS coolant loop 126 via the fluid conduits 127 are the C2C heat exchanger 134, a RESS (second) air separator 146, a RESS (second) fluid reservoir 148, and a three-way flow control valve 150. Starting from the heat exchanger 142 and moving clockwise in FIG. 2, e.g., when the pump 144 is operating in a hot-temp (third) mode or a mild-cold temp (fourth) mode, respectively indicated by black-filled coolant flow arrows M3 and white-filled coolant flow arrows M4: the RESS electronic heat exchanger 142 is fluidly upstream from and coupled to the air separator and reservoir 146, 148; the air separator and reservoir 146, 148 are fluidly upstream from and coupled to the pump 144; the pump 144 is fluidly upstream from and coupled to the RESS section 114; the RESS section 114 is fluidly upstream from and coupled to the control valve 150; and the control valve 150 is fluidly upstream from and coupled to the C2C heat exchanger 134, which is fluidly upstream from and coupled to the heat exchanger 142.

Continuing with the above example, a dedicated (third) set of fluid conduits—shown in FIG. 2 with dashed ( - - - ) lines and designated generally at 129—fluidly interconnects an AC condenser 152 and an AC compressor 154 of the AC coolant loop 128 with the RESS heat exchanger 142 and an AC section 156 of a motor vehicle (e.g., the passenger compartment of electric-drive automobile 10). Also fluidly coupled in the AC coolant loop 128 via the fluid conduits 129 is an AC evaporator (Eva) core 158. Starting from the condenser 152 and moving clockwise in FIG. 2, e.g., with AC refrigerant-based coolant flowing in accordance with dot-filled coolant flow arrows M5: the AC condenser 152 is fluidly upstream from and coupled to the AC section 156; the AC section 156 is fluidly upstream from and coupled to both the RESS heat exchanger 142 and Eva core 158; the RESS heat exchanger 142 and Eva core 158 are both fluidly upstream from and coupled to the AC compressor 154, which is fluidly upstream from and coupled to the condenser 152. It is envisioned that the number, arrangement, coupling points, and individual characteristics of the fluid lines in any given set of conduits may be varied from that which are shown in the drawings without departing from the intended scope of this disclosure.

FIG. 2 shows the joint ATM system 100 equipped with multiple thermodynamic heat exchangers: the PE/DU electronic heat exchanger 130; the C2C heat exchanger 134; the RESS electronic heat exchanger 142; and the AC condenser 152 (with the evaporator 158). Each heat exchanger is designed to transfer heat energy from one fluid medium to another fluid medium. By way of non-limiting example, the PE/DU electronic heat exchanger 130 may be in the nature of a coolant-to-ambient or coolant-to-refrigerant radiator for exchanging heat between an internally flowing liquid coolant and an external fluid medium (ambient air) and/or an internal fluid medium (refrigerant), respectively. The heat exchanger 130 may take on any now available or hereinafter developed form of radiator, such as plate fin, serpentine fin, crossflow, parallel flow, counter flow, polymer or metallic radiators, as well as other types of heat exchanging devices, including adiabatic and hydrodynamic heat exchangers. According to the illustrated example, the ATM system 100 is equipped with an electric radiator fan that can be selectively activated to convectively cool the PE/DU electronic heat exchanger 130, AC condenser 152, and, when desired, the RESS section 114 through cooperative operation with the C2C heat exchanger 134.

Similar to the PE/DU heat exchanger 130 of FIG. 2, the C2C heat exchanger 134, RESS heat exchanger 142, and AC condenser 152 may take on a variety of available device configurations for transferring heat energy from one fluid to another. Continuing with the illustrated example set forth in FIG. 2, RESS heat exchanger 142 may be in the nature of a coolant-to-refrigerant chiller equipped with an electronically controlled heat pump that selectively transfers heat out of chiller coolant flowing in the fluid conduits 127 of RESS coolant loop 126. Additionally, the AC condenser 152 is an apparatus that condenses refrigerant-based coolant flowing in the fluid conduits 129 of the AC loop 128 from a gaseous state to a liquid state by cooling it, e.g., in copper tubing convectively cooled by an electric fan 160. The C2C heat exchanger 134 may be an active or a passive device that transfers heat energy between the coolant fluid flowing in the first and second coolant loops 124, 126. With this arrangement, the joint ATM system 100 eliminates the need for a dedicated heating device—an electronic RESS heater—to actively heat the coolant fluid flowing in the RESS coolant loop 126.

A PE/DU pump 132 and a RESS coolant pump 144, each of which may be of the fixed, positive or variable displacement type, are operable for circulating liquid coolant through their respective coolant loops 124, 126. For instance, the pump 132 may be a bi-directional coolant pump that is interposed between the PE/DU heat exchanger 130 and the C2C heat exchanger 134 in the PE/DU coolant loop 124, and is switchable (e.g., via ECU 25 of FIG. 1) between first and second operating modes to circulate PE radiator fluid in a first coolant flow direction M1 (clockwise in FIG. 2) and a second coolant flow direction M2 (counterclockwise in FIG. 2). By comparison, the RESS pump 144 may be a unidirectional pump interposed between the RESS heat exchanger 142 and the RESS section 114 in the RESS coolant loop 126, and is actuable (e.g., via ECU 25 of FIG. 1) to circulate chiller coolant in a third coolant flow direction M3/M4 (counterclockwise in FIG. 2).

As indicated above, the C2C heat exchanger 134 is fluidly connected to both the PE/DU and RESS coolant loops 124, 126 to selectively transfer heat from coolant fluid circulating in the first set of fluid conduits 125 to coolant fluid circulating in the second set of fluid conduits 127, and vice versa. By way of example, and not limitation, the C2C heat exchanger may be a 3-channel shell-and-tube heat exchanger with an insulated housing stowing therein a first series of tubes that receives coolant fluid from the first loop 124, and a second series of tubes that receives coolant from the second loop 126. These two series of tubes are interlaced such that heat from one fluid is readily transferred to the other fluid. It is envisioned that the C2C heat exchanger take on other active and passive heat exchanger configuration, including microchannel, helical-channel and spiral-channel configurations. An alternative configuration may eliminate the C2C heat exchanger 134 altogether; in such an instance, the first and second coolant loops 124, 126 can be selectively fluidly coupled to mix coolant fluid, when desired, to thereby heat/cool the RESS section 114.

The three-way control valve 150 selectively fluidly connects and disconnects the RESS section 114 to and from the C2C heat exchanger 134. In effect, the control valve 150 is switchable to guide the flow of coolant fluid in coolant loop 126 to and, when desired, around the C2C heat exchanger 134. For instance, the three-way control valve 150 is operable in a first mode (as shown in FIG. 2) to direct coolant fluid flow M4 from the RESS section 114, through the C2C heat exchanger 134, and to the RESS chiller 142. Conversely, when operating in a second mode, the control valve 150 switches outlet ports such that the coolant fluid flows in accordance with coolant flow arrows M3 from the RESS section 114, around the C2C heat exchanger 134, and to the second electronic heat exchanger.

A blocking bypass thermostat valve 140 selectively fluidly connects and disconnects the PE/DU pump 132 and C2C heat exchanger 134 to and from the PE/DU heat exchanger 130. In effect, this flow control valve 140 is switchable to guide the flow of coolant in coolant loop 124 to and, when desired, around the electronic heat exchanger 130. For instance, the bypass valve 140 is operable in a first mode to direct the coolant fluid flow M1 from the C2C heat exchanger 134, pump 132, and air separator 136, through the PE/DU heat exchanger 130, and to the PE section 110. In contrast, when operating in a second mode, the bypass valve 140 switches outlet ports such that coolant fluid flowing in the first loop 124 is directed in accordance with coolant flow arrow M6 from the C2C heat exchanger 134, around the heat exchanger 130, and to the PE section 110.

Using the system architecture illustrated in FIG. 2, the RESS section 114 can be more readily warmed in cold operating conditions due to more heat availability from PE coolant loop 124 than what is typically available through a conventional RESS heater. This, in turn, will help to improve the vehicle's drivability and battery life. In mild weather conditions, the RESS section 114 can be more readily cooled by ambient air fed through the PE loop 124 (e.g., without any need to run the AC condenser 152 or compressor 154). In hot weather conditions, by comparison, the RESS section 110 may be first cooled through operation of the RESS chiller 142; after this initial cooling period, the operating temperature of the RESS section 110 is continuously maintained using the PE loop 124. As an example, three ATM system operating modes may be implemented (e.g., by a thermostat) depending on ambient temperature and battery temperature: (1) cold weather conditions (e.g., below −10° C., calibratable): RESS chiller is disengaged or blocked, the radiator fan is disengaged or blocked, and the C2C heat exchanger is engaged; (2) mild weather condition (e.g., approximately −10° C. to 30° C., calibratable): RESS chiller loop is disengaged or blocked, the radiator fan loop is engaged or active, and the C2C heat exchanger is engaged; and (3) hot weather condition (e.g., above 30° C., calibratable): RESS chiller loop is engaged or active, the radiator fan loop is engaged or active, and the C2C heat exchanger is disengaged.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A thermal management system for an electric-drive motor vehicle, the motor vehicle including a drive unit (DU) section with a prime mover, a power electronics (PE) section with an electronic control module, and a rechargeable energy storage system (RESS) section with an electric storage unit, the thermal management system comprising:
    a first electronic heat exchanger configured to actively transfer heat from a first coolant fluid to cooling fluid;
    a first pump configured to circulate the first coolant fluid emitted from the first electronic heat exchanger;
    a first coolant loop with a first set of fluid conduits fluidly connecting the first electronic heat exchanger, the first pump, the DU section, and the PE section;
    a second electronic heat exchanger configured to actively transfer heat from a second coolant fluid to cooling fluid;
    a second pump configured to circulate the second coolant fluid emitted from the second electronic heat exchanger;
    a second coolant loop with a second set of fluid conduits fluidly connecting the second electronic heat exchanger, the second pump, and the RESS section; and
    a coolant-to-coolant (C2C) heat exchanger fluidly connected to the first and second coolant loops and configured to selectively transfer heat between the first coolant fluid circulating in the first set of fluid conduits and the second coolant fluid circulating in the second set of fluid conduits.

2. The thermal management system of claim 1, wherein the motor vehicle further includes an air conditioning (AC) section, the thermal management system further comprising:
    an electronic compressor configured to compress a third coolant fluid;
    an electronic condenser configured to condense the compressed third coolant fluid emitted from the electronic compressor; and
    a third coolant loop with a third set of fluid conduits fluidly connecting the electronic compressor, the electronic condenser, the AC section, and the second heat exchanger.

3. The thermal management system of claim 1, further comprising a three-way control valve configured to fluidly connect the RESS section to the C2C heat exchanger and to selectively divert the flow of the second coolant fluid from the C2C heat exchanger.

4. The thermal management system of claim 3, wherein the three-way control valve is operable in first and second modes: when in the first mode, the three-way control valve directs the second coolant fluid flow from the RESS section, through the C2C heat exchanger, and to the second electronic heat exchanger; and, when in the second mode, the three-way control valve directs the second coolant fluid flow from the RESS section, around the C2C heat exchanger, and to the second electronic heat exchanger.

5. The thermal management system of claim 1, further comprising a bypass valve fluidly connecting the C2C heat exchanger to the first electronic heat exchanger and configured to selectively divert the flow of the first coolant fluid from the first electronic heat exchanger.

6. The thermal management system of claim 5, wherein the bypass valve is operable in first and second modes: when in the first mode, the bypass valve directs the first coolant fluid flow from the C2C heat exchanger, through the first electronic heat exchanger, and to the PE section; and, when in the second mode, the bypass valve directs the first coolant fluid flow from the C2C heat exchanger, around the first electronic heat exchanger, and to the PE section.

7. The thermal management system of claim 1, further comprising an electric fan configured to convectively cool the first electronic heat exchanger and the RESS section.

8. The thermal management system of claim 1, further comprising a first air separator and a first fluid reservoir interposed between the first pump and the C2C heat exchanger in the first coolant loop.

9. The thermal management system of claim 1, further comprising a second air separator and a second fluid reservoir interposed between the second electronic heat exchanger and the second pump in the second coolant loop.

10. The thermal management system of claim 1, wherein the first pump is a bi-directional coolant pump interposed between the first electronic heat exchanger and the C2C heat exchanger in the first coolant loop, and wherein the second pump is a unidirectional pump interposed between the second electronic heat exchanger and the C2C heat exchanger in the second coolant loop.

11. The thermal management system of claim 1, wherein the first electronic heat exchanger is a coolant-to-ambient radiator, the first coolant fluid is radiator fluid, and the first pump is a radiator pump.

12. The thermal management system of claim 1, wherein the second electronic heat exchanger is a coolant-to-refrigerant chiller, the second coolant fluid is chiller coolant, and the second pump is a chiller pump.

13. The thermal management system of claim 1, characterized by a lack of an electronic heating device dedicated to actively heating the second coolant fluid flowing in the second coolant loop.

14. The thermal management system of claim 1, characterized by a lack of a fluid coupling configured to fluidly connect the first and second coolant loops.

15. An electric-drive motor vehicle comprising:
a vehicle body with a plurality of road wheels;
a drive unit (DU) section with an electric motor operable to drive the road wheels;
a power electronics (PE) section with a traction power inverter module (TPIM), an accessory power module (APM), and/or an onboard charging module (OBCM);
a rechargeable energy storage system (RESS) section with a traction battery pack;
a first coolant loop including a radiator, a radiator pump configured to circulate radiator fluid emitted from the radiator, and a first set of fluid conduits fluidly interconnecting the radiator, the radiator pump, the DU section, and the PE section;
a second coolant loop including a RESS chiller, a RESS pump configured to circulate chiller fluid emitted from the RESS chiller, and a second set of fluid conduits fluidly interconnecting the RESS chiller, the RESS pump, and the RESs section; and
a coolant-to-coolant (C2C) heat exchanger fluidly connected to the first and second coolant loops and configured to selectively transfer heat between the radiator coolant circulating in the first set of fluid conduits and the chiller coolant circulating in the second set of fluid conduits.

16. The motor vehicle of claim 15, further comprising a third coolant loop with an air conditioning (AC) compressor, an AC condenser configured to condense compressed refrigerant emitted from the AC compressor, and a third set of fluid conduits fluidly interconnecting the AC compressor, the AC condenser, the RESS chiller, and a passenger compartment of the motor vehicle.

17. The motor vehicle of claim 15, further comprising a three-way control valve fluidly connecting the RESS section to the C2C heat exchanger and configured to selectively direct the flow of the chiller fluid to and divert the chiller fluid around the C2C heat exchanger.

18. The motor vehicle of claim 15, further comprising a bypass valve fluidly connecting the C2C heat exchanger to the radiator and configured to selectively direct the flow of the radiator fluid to and divert the radiator fluid around the radiator.

19. The motor vehicle of claim 15, further comprising an electric radiator fan configured to convectively cool the radiator and the RESS section.

20. The motor vehicle of claim 15, further comprising:
a first air separator and a first fluid reservoir interposed between the radiator pump and the C2C heat exchanger in the first coolant loop; and
a second air separator and a second fluid reservoir interposed between the RESS chiller and the RESS pump in the second coolant loop.

* * * * *